United States Patent
Nagatani et al.

(10) Patent No.: US 7,824,644 B2
(45) Date of Patent: Nov. 2, 2010

(54) PARTICULATE SILICA

(75) Inventors: Yasuhiro Nagatani, Shunan (JP); Ryuji Ishimoto, Shunan (JP); Masao Ariyuki, Shunan (JP)

(73) Assignee: Tokuyama Corporation, Shunan-shi (JP)

( * ) Notice: Subject to any disclaimer, the term of this patent is extended or adjusted under 35 U.S.C. 154(b) by 276 days.

(21) Appl. No.: 11/920,567

(22) PCT Filed: May 19, 2005

(86) PCT No.: PCT/JP2005/009582

§ 371 (c)(1),
(2), (4) Date: Nov. 16, 2007

(87) PCT Pub. No.: WO2006/123433

PCT Pub. Date: Nov. 23, 2006

(65) Prior Publication Data

US 2009/0230351 A1    Sep. 17, 2009

(51) Int. Cl.
*C01B 33/12* (2006.01)
*B01D 19/24* (2006.01)
*B60C 1/00* (2006.01)

(52) U.S. Cl. .................. 423/335; 423/338; 423/339; 516/116; 524/492; 524/493

(58) Field of Classification Search ............ 252/182.32; 516/122; 524/493, 492, 557; 423/335, 338, 423/339
See application file for complete search history.

(56) References Cited

U.S. PATENT DOCUMENTS

2002/0042467 A1* 4/2002 Matsukawa et al. ......... 524/493

2003/0114542 A1* 6/2003 Mohnot et al. .............. 516/122

FOREIGN PATENT DOCUMENTS

| EP | 0 038 900 A1 | 11/1981 |
| EP | 0 092 024 A1 | 10/1983 |
| JP | 60-127215 A | 7/1985 |
| JP | 2003-149855 A | 5/2003 |

OTHER PUBLICATIONS

Dale W. Schaefer et al., "Fractal Geometry of Colloidal Aggregates," Physical Review Letters, Jun. 25, 1984, p. 2371 to p. 2374, vol. 52, No. 26.

* cited by examiner

*Primary Examiner*—Ling-Siu Choi
*Assistant Examiner*—Monique Peets
(74) *Attorney, Agent, or Firm*—Birch, Stewart, Kolasch & Birch, LLP

(57) ABSTRACT

There is provided particulate silica which can be suitably used as a viscoelasticity modifier such as a thickener which is added to liquid such as water, a liquid resin or paint to adjust its viscoelastic properties such as viscosity and thixotropic nature, a reinforcer or filler for silicone rubber or sealants, a polishing agent for CMP (Chemical Mechanical Polishing) or a surface coating agent for ink-jet printing paper.

The particulate silica has a BET specific surface area S of 130 to 380 m²/g, and its fractal shape parameter α1 in an α-value analysis target range of 20 to 30 nm satisfies the following equation (1) and its fractal shape parameter α2 in an α-value analysis target range of 30 to 50 nm satisfies the following equation (2).

$$\alpha 1 + 0.00175 S < 2.518 \quad (1)$$

$$\alpha 2 + 0.00174 S < 2.105 \quad (2)$$

8 Claims, 1 Drawing Sheet

PARTICULATE SILICA

FIELD OF THE INVENTION

This invention relates to novel particulate silica having a specific particle structure at a specific microstructural site. More specifically, it relates to particulate silica having such excellent properties that it stably exerts a very high thickening effect while exhibiting high dispersibility when added to a solvent and also exerts a high liquid absorbing effect after dried, by having a specific particle structure at a specific microstructural site.

BACKGROUND ART

Particulate silica referred to as fumed silica that is produced by a dry method is known to have an effect of imparting high viscosity and thixotropic nature to liquid when added to the liquid. With such a characteristic, it is widely used as a thickener for water, liquid resins, paint or the like.

Meanwhile, when the above particulate silica is used as a thickener, it is desired from the viewpoints of the production cost and workability of a product to be obtained that its amount to be added be reduced. Particulate silica exerting a high thickening effect even when added in a small amount is demanded.

To meet the demand, various proposals have been made to improve the thickening effect of the above particulate silica.

For example, there has been proposed a method for producing particulate silica by thermally decomposing a volatile silicon compound in flame, wherein siloxane is used as the raw material volatile silicon compound to improve the thickening effect of the particulate silica to be obtained (refer to EP38900 and EP92024).

Further, in the above patent literatures, it is also described that halogenated silicon such as silicon tetrachloride (hereinafter also referred to as "tetrachlorosilane") may be used in combination with siloxane.

Although the above particulate silica exhibits a high thickening effect when added to a liquid resin or the like, a thickening effect to be obtained may be varied significantly by the capability of agitator. The thickening effect cannot be obtained by gentle agitation. Further, to obtain the thickening effect by gentle agitation, the amount of the particulate silica to be added must be increased.

It is assumed that the above phenomenon occurs because the method described in the above patent literatures primarily use a silicon compound such as siloxane as a raw material in thermal decomposition in flame. That is, since siloxane has an effect of increasing flame length as compared with silicon tetrachloride which is generally used in production of particulate silica, the increased flame length intensifies fusion of primary particles of particulate silica, and as aggregation caused by the fusion proceeds, massive aggregates increase. Thus, when shear force of agitation or the like is low, aggregates resulting from strong fusion are not crumbled easily, and the particulate silica cannot exert a sufficient thickening effect and are unable to exert a stable thickening effect easily.

DISCLOSURE OF THE INVENTION

Therefore, an object of the present invention is to provide particulate silica capable of exerting an excellent thickening effect stably without being significantly influenced by such conditions as agitation and even in a low dispersion region when added to water, a liquid resin, paint or the like.

To solve the above technical problem, the present inventors have made intensive studies on conditions for a method for producing particulate silica by a dry method, the structure of the particulate silica to be obtained, and a thickening effect due to the structure.

As a result, they have found that particulate silica obtained by conducting decomposition of a volatile silicon compound in flame under a specific condition can have an aggregation structure of primary particles having specificity (fractal nature) at a specific microstructural site and can exert an excellent thickening effect due to an effect different from that of the above method using siloxane.

Further, the present inventors have also found that the particulate silica having the structure is easily dispersed in a dispersion medium such as water, a liquid resin or paint due to weak fusion between primary particles, the above specific structure does not come apart easily and the silica can retain high viscosity even when dispersed, and the particulate silica having the above specific structure also exerts good liquid absorbability when incorporated in a coating layer of ink-jet printing paper. The present inventors have completed the present invention based on these findings.

That is, the present invention provides particulate silica having a BET specific surface area (S) of 130 to 380 m$^2$/g, wherein in small-angle X-ray scattering analysis, a fractal shape parameter ($\alpha$1) in an $\alpha$-value analysis target range of 20 to 30 nm satisfies the following equation (1) and a fractal shape parameter ($\alpha$2) in an $\alpha$-value analysis target range of 30 to 50 nm satisfies the following equation (2).

$$\alpha1+0.00175S<2.518 \tag{1}$$

$$\alpha2+0.00174S<2.105 \tag{2}$$

Further, the above particulate silica can be hydrophobized, depending on the type of solvent to be added.

That is, the present invention also provides hydrophobized particulate silica obtained by hydrophobizing the surface of the above particulate silica.

Further, the present invention also provides an aqueous dispersion obtained by dispersing the above particulate silica in an aqueous solvent and having stable viscosity.

Further, the present invention provides a thickener for liquid resins and a filler for liquid resins which comprise the above particulate silica, as applications using the high thickening effect of the particulate silica.

Still further, the present invention also provides a filler for ink-jet printing paper which comprises the above particulate silica, as an application using the liquid absorbability of the particulate silica.

Further, the present invention provides a method for producing particulate silica by flame-hydrolyzing a volatile silicon compound in the presence of hydrogen, wherein mixed gas comprising 20 to 90 vol % of trichlorosilane and 10 to 80 vol % of tetrachlorosilane is used as the volatile silicon compound, and the amount of hydrogen used in flame hydrolysis is 1.20 to 2.20 times the theoretical amount, as a suitable production method capable of producing the above particulate silica.

ILLUSTRATIVE FORM OF THE PREFER INVENTION

Figure 1:
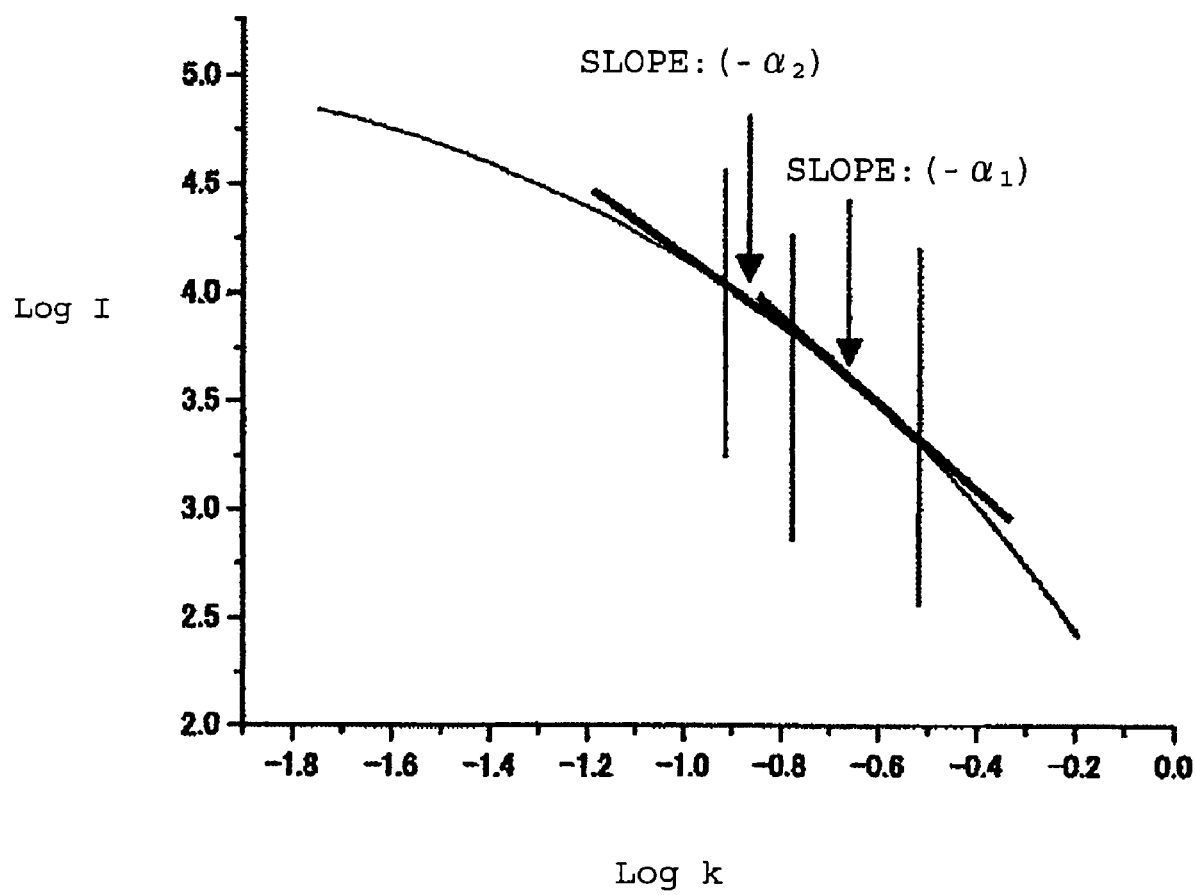
FIG. 1 is a diagram for illustrating the relationship between scattering intensity (I) and a scattering vector (k) by small-angle X-ray scattering, for determining the fractal shape parameter of the particulate silica of the present invention.

In the present invention, a fractal shape parameter (α value) is a value measured in accordance with the following method. Details of the fractal shape parameter are described in Physical Review Letters, Volume 52, Number 26, p. 2371 to p. 2374 (1984) by D. W. Schaefer et al., for example.

That is, the α value can be determined by small-angle X-ray scattering measurement. Since information about a periodic structure of nanometers or larger which cannot be obtained by general X-ray diffraction (information about the period and frequency of structure) can be obtained by the small-angle X-ray scattering measurement, the α value can be determined based on this information.

That is, when particulate silica is subjected to the small-angle X-ray scattering measurement, the particulate silica exists as a collection of agglomerated particles of various shapes and particle diameters resulting from fusion of primary particles due to its production method. Accordingly, a small-angle X-ray scattering curve to be obtained is superposition of scattering curves according to periods of various sizes.

Therefore, by analyzing the obtained small-angle X-ray scattering curve, a "fractal parameter (α value) which is an indicator for the shape of agglomerated particles" corresponding to the frequency of periodic structures of various sizes can be determined. That is, since the relationship represented by the following equation exists among scattering intensity (I) after background adjustment, a scattering vector (k) and a fractal shape parameter (α) in small-angle X-ray scattering, the α value can be determined from a small-angle X-ray scattering curve plotted when the horizontal axis is k and the vertical axis is I.

$$I \propto k^{-\alpha}$$

provided $k = 4\pi\lambda^{-1} \sin\theta$ wherein I is scattering intensity, k is a scattering vector (unit: $nm^{-1}$), π is a circle ratio, λ is the wavelength of incident X-ray (unit: nm), and θ is an X-ray scattering angle (θ is α value obtained by multiplying the scanning angle of sensor by 0.5).

To obtain a small-angle X-ray scattering curve, a sample is irradiated with a monochromatic X-ray narrowed down by use of a slit and a block, and the X-ray scattered by the sample is detected with the scanning angle of sensor changed. Then, as shown in FIG. 1, the relationship between a scattering vector (k) determined from an X-ray scattering angle (θ) by the above equation and scattering intensity (I) after background adjustment is determined by plotting the scattering vector (k) on the horizontal axis and the scattering intensity (I) on the vertical axis. In this case, when they are plotted on a double logarithmic scale, an α value can be determined because the slope of a tangent to the small-angle X-ray scattering curve at a certain value of k is equal to −α.

The background adjustment can be carried out by subtracting the scattering intensity of measurement cell without the sample from the scattering intensity of the sample.

When the size of the α value analysis target is D (nm), the relationship represented by the following equation holds between k and D, since the relationship of Bragg equation (2D×sin θ=λ) exists among D, an X-ray scattering angle θ and an incident X-ray wavelength λ.

$$D = 2\pi k^{-1}$$

The size of the above α value analysis target must be 20 to 30 nm and 30 to 50 nm so as to represent the aggregation structure of the particulate silica of the present invention. When the size of the analysis target is smaller than 20 nm, the surface shape of primary particles of the silica is analyzed, so that the aggregation structure of the particulate silica of the present invention cannot be represented. Meanwhile, when the size of the analysis target is larger than 50 nm, the influence of bulk density becomes remarkable, so that the aggregation structure of the silica cannot be represented. The size of voids (sources of pores) formed by fusion of primary particles of the silica is about several nanometers to several ten nanometers. Since this void is deeply related to the thickening effect and liquid absorbing effect of the silica, the size of the analysis target must be 20 to 30 nm and 30 to 50 nm so as to represent the aggregation state of the particulate silica accurately.

Thus, to determine fractal shape parameters in α-value analysis target ranges of 20 to 30 nm and 30 to 50 nm in the present invention, the scattering curve in the above obtained double logarithmic plot of scattering intensity (I) and scattering vector (k) is sectioned in a range of k=0.209 to 0.315 corresponding to D=20 to 30 nm and a range of k=0.125 to 0.209 corresponding to D=30 to 50 nm, the approximate straight lines of the scattering curves of the sectioned ranges are determined by a least square method, and their slopes are determined. Thereby, fractal shape parameters α1 and α2 of the above ranges of primary particle diameters can be determined.

The material of the particulate silica of the present invention is not particularly limited as long as it comprises silica alone or as a main component. Specific examples of the material include silica, and composite oxides of silica and other metals. Specific examples of the composite oxides include composite oxides using silica and at least one of other metals such as alumina, titania, zirconia and calcia. In this case, the proportion of the other metal is preferably 50 mol % or lower, more preferably 30 mol % or lower.

The particulate silica of the present invention has a BET specific surface area (S) of 130 to 380 $m^2/g$, preferably 140 to 340 $m^2/g$. That is, when the BET specific surface area is smaller than 130 $m^2/g$, the effect of the following fractal parameter values is not fully exhibited even if the values are within specific ranges, so that the particulate silica cannot exert a high thickening effect which is to be achieved by the present invention. Meanwhile, when the BET specific surface area is larger than 380 $m^2/g$, cohesion of particles of the particulate silica becomes stronger together with a larger specific surface area, so that low dispersion not only prevents achievement of a high thickening effect but also makes production difficult.

The greatest characteristic of the particulate silica of the present invention is that a fractal shape parameter (α1) in an α-value analysis target range of 20 to 30 nm satisfies the following equation (1) and a fractal shape parameter (α2) in an α-value analysis target range of 30 to 50 nm satisfies the following equation (2).

$$\alpha 1 + 0.00175 S < 2.518 \tag{1}$$

$$\alpha 2 + 0.00174 S < 2.105 \tag{2}$$

The present inventors have analyzed structural differences between the particulate silica of the present invention and conventional particulate silica obtained by a dry method from various viewpoints. As a result, they have found that as compared with the conventional particulate silica having the same specific surface area, the particulate silica of the present invention has fine primary particles in a specific and complicated aggregation state at a microstructural site. They have also found that particulate silica having the two fractal shape parameters ($\alpha 1$ and $\alpha 2$) representing the complication within the specific ranges not only shows a characteristic of having a very high thickening effect but also shows excellent viscosity characteristics even in a low dispersion region after dispersed in water or the like.

Accordingly, particulate silica whose $\alpha 1$ and $\alpha 2$ values do not satisfy the ranges represented by the above equations (1) and (2) has problems that the thickening effect is not exerted to a sufficient extent, large mechanical dispersion force is required as in the above prior art and the amount of the silica must be large with respect to a dispersion medium.

Further, the above $\alpha$ value is represented as a function of S since it is also influenced by the specific surface area (S) of the powder. That is, when the present inventors have plotted the relationship between the $\alpha$ value and S for the novel particulate silica according to the present invention and a number of currently available silicas, they have found that an $\alpha$ value ($\alpha 1$) determined from the scattering pattern of an $\alpha$-value analysis target range of 20 to 30 nm (corresponding to an X-ray scattering angle $\theta$=0.147 to 0.221° when a Cu—K$\alpha$ beam is used) and an $\alpha$ value ($\alpha 2$) determined from the scattering pattern of an $\alpha$-value analysis target range of 30 to 50 nm (corresponding to an X-ray scattering angle $\theta$=0.088 to 0.147° when a Cu—K$\alpha$ beam is used) for the particulate silica of the present invention are plotted in different areas from those in which the $\alpha$ values for the conventional silica are plotted.

As can be understood from Examples and Comparative Examples which will be described later, the particulate silica of the present invention shows lower $\alpha$ values than commercially available silica obtained by a flame hydrolysis method or silica obtained by use of the above siloxane as a raw material and has a specific particle structure at a specific microstructural site.

The $\alpha 1$ and $\alpha 2$ of the particulate silica of the present invention particularly preferably satisfy the following equations (3) and (4).

$$2.379 < \alpha 1 + 0.00175 S < 2.518 \quad (3)$$

$$1.965 < \alpha 2 + 0.00174 S < 2.105 \quad (4)$$

In the particulate silica of the present invention, the average particle diameter $D_{50}$ of primary particles determined by analyzing an image from a transmission electron microscope is preferably 5.0 to 20.0 nm. When the average particle diameter $D_{50}$ is within the above range, cohesion of the particles is moderate, and a high thickening effect can be obtained even by low dispersion.

Further, in the particulate silica of the present invention, the particle size distribution of primary particles determined by analyzing an image from a transmission electron microscope is preferably relatively uniform from the viewpoint of a thickening effect. The uniformity of the particle size distribution of primary particles can be represented by a value ($D_{60}/D_{10}$, hereinafter also referred to as "particle size distribution uniformity") resulting from dividing a particle diameter ($D_{60}$) whose integrated value is 60% by a particle diameter ($D_{10}$) whose integrated value is 10%. The closer this value is to 1, the narrower the breadth of the particle size distribution becomes. In the present invention, the above particle size distribution uniformity is preferably lower than 2.0, more preferably 1.70 to 1.95.

Further, the particulate silica of the present invention has relatively high oil absorbability and generally shows an oil absorbability of 240 to 300 ml/100 g.

The particulate silica of the present invention is produced by a method of flame-hydrolyzing a volatile silicon compound. More specifically, in a method of producing particulate silica by flame-hydrolyzing a volatile silicon compound, mixed gas comprising 20 to 90 vol % of trichlorosilane and 10 to 80 vol % of tetrachlorosilane is used as the above volatile silicon compound, and the amount of hydrogen used in the above flame hydrolysis is 1.20 to 2.20 times the theoretical amount.

The above method is a method including a technique for adjusting the length of flame to short length in a flame hydrolysis method (may also be referred to as "flame thermal decomposition method"). Thereby, specificity is imparted to the specific microstructural site of the particulate silica.

In the above production method, when the proportion of trichlorosilane is lower than 20 vol %, the length of flame becomes long, fusion of primary particles of the particulate silica becomes strong, and massive aggregates increase as aggregation caused by the fusion proceeds, resulting in reduction in complication of the specific microstructural site. Meanwhile, when the proportion of trichlorosilane is higher than 90 vol %, the combustion speed of trichlorosilane is so high that the length of flame becomes too short, the density of particulate silica to be produced becomes high, so that dense aggregates are liable to be produced and specificity is not formed easily at the specific microstructural site disadvantageously.

A preferred mixing ratio of trichlorosilane and tetrachlorosilane is 20 to 80 vol % of trichlorosilane for 20 to 80 vol % of tetrachlorosilane, and a more preferred mixing ratio thereof is 30 to 70 vol % of trichlorosilane for 30 to 70 vol % of tetrachlorosilane.

Further, air or oxygen is used as combustion aiding gas, and hydrogen is used as combustible gas.

In the above method, the amount of the above hydrogen used in flame hydrolysis must be 1.20 to 2.20 times the theoretical amount. When the amount of the hydrogen is smaller than 1.20 times of the theoretical amount, the length of flame becomes long, so that primary particles in silica aggregates produced by flame hydrolysis are fused by heat over a wide area, and the specificity of the specific microstructural site is lowered. Meanwhile, making the amount of the hydrogen larger than 2.20 times of the theoretical amount is uneconomical since the specificity of the specific microstructural site does not change significantly any further. The amount of the hydrogen used is preferably 1.30 to 1.80 times the theoretical amount required for flame hydrolysis of the volatile silicon compound.

Meanwhile, the amount of the above oxygen used is generally equal to or larger than the theoretical amount with respect to the volatile silicon compound and hydrogen and is adjusted as appropriate within the above range in view of the desired specific surface area of the particulate silica. Further, in order to adjust the specific surface area of the particulate silica, inert gas such as nitrogen may be used in combination with the above gases.

As for details and other conditions of the method for producing the particulate silica of the present invention, those of a known method can be used as they are.

The particulate silica of the present invention can be used, depending on its type, as a viscosity modifier or thickener for water, paint, liquid unsaturated polyester resins, epoxy resins, urethane resins, vinyl acetate and the like.

Further, when the particulate silica of the present invention is used as an additive such as a thickening agent for polar resins including epoxy resins, liquid unsaturated polyester resins, vinylester resins, urethane resins, modified silicone resins and acrylic resins, it is preferred that the surface thereof be hydrophobized.

In that case, a known hydrophobizing agent can be used. Specific examples thereof include, as silylation agents, chlorosilanes such as methyl trichlorosilane, dimethyl dichlorosilane, trimethyl chlorosilane, phenyl trichlorosilane, diphenyl dichlorosilane, t-butyl dimethylchlorosilane and vinyl trichlorosilane; alkoxysilanes such as tetramethoxysilane, methyl trimethoxysilane, dimethyl dimethoxysilane, phenyl trimethoxysilane, diphenyl dimethoxysilane, o-methylphenyl trimethoxysilane, p-methylphenyl trimethoxysilane, n-butyl trimethoxysilane, i-butyl trimethoxysilane, hexyl trimethoxysilane, octyl trimethoxysilane, decyl trimethoxysilane, dodecyl trimethoxysilane, tetraethoxysilane, methyl triethoxysilane, dimethyl diethoxysilane, phenyl triethoxysilane, diphenyl diethoxysilane, i-butyl triethoxysilane, decyl triethoxysilane, vinyl triethoxysilane, $\gamma$-methacryloxypropyl trimethoxysilane, $\gamma$-glycidoxypropyl trimethoxysilane, $\gamma$-glycidoxypropylmethyl dimethoxysilane, $\gamma$-mercaptopropyl trimethoxysilane, $\gamma$-chloropropyl trimethoxysilane, $\gamma$-aminopropyl trimethoxysilane, $\gamma$-aminopropyl triethoxysilane, $\gamma$-(2-aminoethyl)aminopropyl trimethoxysilane and $\gamma$-(2-aminoethyl)aminopropylmethyl dimethoxysilane; and silazanes such as hexamethyldisilazane, hexaethyldisilazane, hexapropyldisilazane, hexabutyldisilazane, hexapentyldisilazane, hexahexyldisilazane, hexacyclohexyldisilazane, hexaphenyldisilazane, divinyl tetramethyldisilazane and dimethyl tetravinyldisilazane. Further, silicone fluids such as dimethyl silicone fluid, methyl hydrogen silicone fluid, methylphenyl silicone fluid, alkyl modified silicone fluid, chloroalkyl modified silicone fluid, chlorophenyl modified silicone fluid, fatty acid modified silicone fluid, polyether modified silicone fluid, alkoxy modified silicone fluid, carbinol modified silicone fluid, amino modified silicone fluid, fluorine modified silicone fluid and terminal reactive silicone fluid, and siloxanes such as hexamethylcyclotrisiloxane, octamethylcyclotetrasiloxane, decamethylcyclopentasiloxane, hexamethyldisiloxane and octamethyltrisiloxane are also preferred as a hydrophobizing agent. In addition, fatty acids and metal salts thereof are also used as a hydrophobizing agent. Illustrative examples thereof include long-chain fatty acids such as undecylic acid, lauric acid, tridecylic acid, dodecylic acid, myristic acid, palmitic acid, pentadecylic acid, stearic acid, heptadecylic acid, arachidic acid, montanic acid, oleic acid, linoleic acid and arachidonic acid. Illustrative examples of the metals salts thereof include salts with metals such as zinc, iron, magnesium, aluminum, calcium, sodium and lithium.

Of these, the silylation agents are the most common, and the alkoxysilanes and silazanes are preferred since they are easy to carry out processing.

In the present invention, a particular degree of hydrophobicity required according to an application can be achieved by treating the surface by using one of these hydrophobizing agents alone or using two or more of them as a mixture or in turn.

Although the amount of the above hydrophobizing agent is not particularly limited, it is suitably 1 to 50 wt % based on the particulate silica so as to obtain a sufficient hydrophobizing effect.

The hydrophobization can be conducted by a known method. For example, it can be carried out by a continuous method or batch method. Although an organosilicon compound may be allowed to react in a liquid phase, reaction in a gas phase is preferred because of high reactivity. Further, a reactor may be a fluidized-bed type or fixed-bed type, or the hydrophobization may be carried out by use of a simple mixer, pressure vessel or the like. To accelerate the reaction, a basic material such as water or ammonia may be added. Prior to the reaction, the inside of the reactor is desirably purged with inert gas such as nitrogen to avoid decomposition of the organosilicon compound.

Further, even after the reaction, the inside of the reactor is desirably purged with inert gas such as nitrogen to remove and dry unreacted materials and side products. The reaction temperature and time are not particularly limited. For example, the reaction is carried out at room temperature to 600° C., preferably 50 to 400° C., for at least 10 minutes, preferably 60 to 180 minutes.

The particulate silica of the present invention is also excellent as a liquid absorbing carrier since it has an excellent capability of including a solution at a microstructural site. Accordingly, for example, it can be suitably used as a filler for a coating layer of ink-jet printing paper.

In general, ink-jet printing paper has a coating layer which serves as an ink absorbing layer intended to absorb ink formed on one or both surfaces of a substrate, and silica is used as a filler for the coating layer. However, since silica particles themselves have no film formability, a coating solution containing silica is produced by mixing a silica dispersion having silica dispersed in a polar solvent such as water with a binder such as polyvinyl alcohol. This coating solution is applied on a substrate and then dried to obtain ink-jet printing paper having an ink absorbing layer formed on the substrate.

Meanwhile, as ink-jet ink, an anionic compound is generally used. However, since silica particles exhibit anionic nature, it is often practiced to modify the surface of the silica cationic by mixing a cationic resin solution into the silica dispersion so as to improve image density and water resistance.

Therefore, when the particulate silica of the present invention is used as a filler for ink-jet printing paper, it is preferably formed into a modified silica dispersion resulting from modifying the surface of the silica cationic by a cationic resin solution.

Further, in recent years, since ink-jet printing papers which provides images comparable to photographs have been demanded in the market, a method of reducing the diameters of silica aggregated particles in the silica dispersion to around several hundred nanometers is used.

Even when the diameters of aggregated particles of the particulate silica of the present invention are reduced to around several hundred nanometers in a polar solvent, the pore volume of a coating layer tends to become high as compared with particulate silica produced by a conventional method when the particulate silica of the present invention is used as a filler for the coating layer of ink-jet printing paper, since the particulate silica of the present invention maintains a particle structure having specificity (fractal nature) at a specific microstructural site as described above. The pore volume of the coating layer relates to ink absorbability. A larger pore volume is highly preferable since ink absorbability becomes higher.

The polar solvent used for dispersing the particulate silica of the present invention is not particularly limited as long as it is a polar solvent in which the particulate silica is dispersed easily. As the polar solvent, water, polar solvents such as alcohols, e.g. methanol, ethanol and isopropyl alcohol, ethers and ketones, and mixtures of water and the above polar solvents can be suitably used, for example. Of these, water is the most preferable.

The cationic resin used for modifying the particulate silica of the present invention cationic is not particularly limited as long as it is a resin which is dissociated and becomes cationic when dissolved in the polar solvent. Known cationic resins can be used without particular limitations.

Of these, resins having a primary, secondary or tertiary amine group or a quaternary ammonium salt group can be suitably used. Specific examples thereof include compounds such as polyethylenimine, polyvinylpyridine, polyaminesulfone, polydialkylaminoethyl methacrylate, polydialkylaminoethyl acrylate, polydialkylaminoethyl methacrylamide, polydialkylaminoethyl acrylamide, polyepoxyamine, polyamideamine, dicyandiamide-formalin condensate, dicyandiamidepolyalkyl-polyalkylenepolyamine condensate, polyvinylamine and polyallylamine and hydrochlorides of the above compounds, copolymers such as polydiallyl dimethyl ammonium chloride and its acrylamide, polydiallyl methylamine hydrochloride, and polymethacrylic ester methyl chloride quaternary salt.

In the present invention, the cationic resin is used in an amount of preferably 2 to 50 parts by weight, particularly preferably 2 to 15 parts by weight, based on 100 parts by weight of the particulate silica so that the modified silica dispersion can be produced stably without gelling during its production and the obtained modified silica dispersion has low viscosity. It is highly preferable that the viscosity of the modified silica dispersion be low, because ease of handling becomes high in a subsequent production process for producing the coating solution.

The viscosity of the modified silica dispersion with respect to the added amount of the cationic resin varies depending on the specific surface area of silica and the type of the cationic resin to be added. Hence, it is preferable to select an optimum added amount which achieves the lowest viscosity of the dispersion from the above added amounts by experiments in advance.

A method for producing the modified silica dispersion by modifying the particulate silica of the present invention cationic by use of the cationic resin is not particularly limited. A method comprising mixing and dispersing the polar solvent, particulate silica and cationic resin in advance to prepare a premixed solution containing the particulate silica and cationic resin in the polar solvent and then atomizing the silica particles in the premixed solution to around several hundred nanometers by use of a high-performance atomization unit is suitably used.

A method of producing the premixed solution by mixing and dispersing the polar solvent, particulate silica and cationic resin solution in advance is not particularly limited. For example, a method of dispersing the particulate silica directly into the cationic resin aqueous solution adjusted to a predetermined cationic resin concentration or a method of mixing the silica dispersion having the particulate silica dispersed in the polar solvent in advance into the cationic resin aqueous solution may be used.

A device for mixing and dispersing the particulate silica of the present invention, polar solvent and cationic resin aqueous solution in advance is not particularly limited. Illustrative examples of the device include commonly used agitators having propeller blades, turbine blades or paddle blades, high-speed rotating centrifugal radiation agitators such as DISPER mixer, high-speed rotating shearing dispersing devices such as a homogenizer, homomixer and ultramixer, dispersing devices such as a colloid mill, planetary mixer and suction dispersing device, and composite dispersing devices obtained by combining the above dispersing devices.

The high-performance atomization unit which atomizes the silica particles to around several hundred nanometers after preparation of the premixed solution is not particularly limited. Illustrative examples thereof include wet-media-type grinding mills such as a bead mill and a sand mill, a high-pressure homogenizer and an ultrasonic grinding mill. Of the above high-performance atomization unit, the high-pressure 30, homogenizer can be the most suitably used.

Illustrative examples of the high-pressure homogenizer include "NANOMIZER" (trade name) of NANOMIZER CO., LTD., "MICROFLUIDIZER" (trade name) of MICROFLUIDICS CO., LTD., and "ULTIMAIZER" (trade name) of SUGINO MACHINE LIMITED.

A modified silica dispersion having an average aggregated particle diameter of around several hundred nanometers can be obtained by causing the silica dispersion to collide with one another at a process pressure of not lower than 30 MPa or causing the silica dispersion to pass through an orifice with a difference in pressure between the inlet side and outlet side of the orifice of not lower than 30 MPa by use of the above high-pressure homogenizer.

Further, to improve the preservation stability and dispersibility of the silica particles, a surfactant, a fungicide and the like may be added to the modified silica dispersion in such a small amount that does not impair the effect of the present invention.

The temperature (hereinafter referred to as "dispersion production temperature") when the modified silica dispersion is produced by use of the particulate silica of the present invention is preferably controlled within a temperature range of not higher than 40° C. so as to produce the modified silica dispersion stably without the occurrence of an increase in viscosity and gelation during production.

A method for controlling the dispersion production temperature within a temperature range of not higher than 40° C. is not particularly limited. It is preferable to control the temperature such that a constant temperature is kept within a temperature range of not higher than 40° C.

Further, the silica dispersion having the particulate silica dispersed in the polar solvent shows a phenomenon that the viscosity of coating solution obtained by mixing a silica dispersion immediately after the particulate silica has been dispersed in the polar solvent with a binder is significantly different from the viscosity of coating solution obtained by mixing a silica dispersion which has been aged for a few days after the particulate silica has been dispersed in the polar solvent with a binder, regardless of the presence or absence of an additive such as a cationic resin. If the viscosities of the coating solutions differ extremely, conditions for coating the solution on a substrate by a coater, i.e. coating conditions vary, resulting in a serious problem in management of production process. Accordingly, when the silica dispersion using the particulate silica is used as the raw material coating solution, it is preferable to give a term of allowing the dispersion to age under predetermined conditions after the particulate silica is dispersed in the polar solvent.

Therefore, the modified silica dispersion using the particulate silica of the present invention is also preferably given for a term to be aged under predetermined conditions after the silica is dispersed in the polar solvent.

Further, as to other applications of the particulate silica of the present invention, it can be widely and suitably used in fields in which fumed silica has been used, e.g. as a reinforcer or filler for silicone rubber or sealants or a polishing agent for CMP (Chemical Mechanical Polishing).

EFFECTS OF THE INVENTION

The particulate silica of the present invention is novel particulate silica having a specific shape represented by a fractal shape parameter at a microstructural site and has a different aggregated particle structure from that of conventional particulate silica resulting from development of aggregation of particles and is assumed to exert a different thickening effect due to the difference in the aggregated particle structure.

Further, due to the difference in the structure, the particulate silica of the present invention has a characteristic that it has high dispersibility, its thickening effect is hardly influenced by the ability of dispersing device such as an agitator which is used to disperse the particulate silica and a high thickening effect is obtained by using even a dispersing device having a low dispersion ability and a characteristic that since the structure of aggregation of primary particles is more specific and complicated three-dimensional structure and voids to take in a solvent such as ink are large, ink retainability is improved and good printability is obtained when the particulate silica is used as a surface coating agent for ink-jet printing paper.

Therefore, the particulate silica of the present invention can be suitably used for applications including a thickener for liquid resins such as a liquid unsaturated polyester, a reinforcer or filler for silicone rubber or sealants, a polishing agent for CMP (Chemical Mechanical Polishing) and a surface coating agent for ink-jet printing paper.

EXAMPLES

Hereinafter, the present invention will be further described with reference to Examples and Comparative Examples. However, the present invention shall not be limited to these Examples in any way.

Measurements of physical properties in the following Examples and Comparative Examples were conducted in the following manner.

(1) Small-angle X-ray Scattering Measurement: Particulate silica was filled in a through-hole of a sample holder having a length of 40 mm, a width of 5 mm and a thickness of 1 mm, both sides of the filled sample were held by a polypropylene film having a thickness of 6 µm, and the resulting sample was subjected to measurement. The measurement was made by use of a twin-screw small-angle X-ray scattering unit (M18XHF22) of MACSCIENCE CO., LTD. equipped with Kratzky U-slit and an incident X-ray Cu—Kα beam at a tube voltage of 40 kV, a tube current of 300 mA, a slit width of 10 µm and a sensor scanning angle of 0.025 to 0.900°. The measurement was conducted for 5 times in total per sample, and its average value was taken as a measured value.

(2) Measurement of Specific Surface Area: This was measured by use of a specific surface area measuring instrument (SA-1000) of Shibata Rikagaku Kenkyu-jyo in accordance with a nitrogen adsorption BET one-point method.

(3) Measurements of Average Particle Diameter and Particle Size Distribution Uniformity: 1 mg of particulate silica and 10 ml of pure water were put into a sample tube bottle and ultrasonic-cleaned by an ultrasonic cleaner (MODEL VS-D100 of IUCHI SEIEIDOU) filled with about 1 L of water for 30 minutes. Grids with a support membrane (carbon-reinforced collodion membrane, Cu150 mesh) were made hydrophilic by use of SPTTERCOATER without a target at 10 mA for 60 seconds. The particulate silica suspension was dropped on the grids placed on filter paper, and even liquid remaining on the grids was blotted by the filter paper. The residue was air-dried and used as a sample to be observed. The sample was observed by use of a transmission electron microscope (JEM-200CX of JEOL LTD.) at a magnification of 150,000. 25 images were taken per sample, images with a final magnification of about 566,000 were subjected to circular particle analysis by use of an image analyzer (IP-100° C. of Asahi Engineering CO., LTD.), and the average particle diameter and particle size distribution uniformity were calculated from particle size distribution and integrated values of particle sizes.

(4) Method for Measuring Oil Absorbability: Oil absorbability was measured in accordance with JIS-K5101.

(5) Measurement of Carbon Content: The carbon content (C content) of particulate silica hydrophobized by a hydrophobizing agent was measured by an in-metal carbon analyzer (EMIA-110 of HORIBA, LTD.).

(6) Method for Measuring Average Particle Diameter of Modified Silica Dispersion: After a modified silica dispersion was diluted with ion exchange water such that the silica concentration of the dispersion became 10 wt %, the volume-based arithmetic average diameter ($D_{60}$) was measured by use of a light scattering diffraction particle size distribution meter ("COULTER LS230" (trade name) of BECKMAN COULTER CO., LTD.), and this value was taken as an average particle diameter.

(7) Method for Measuring Pore Volume of Coating Layer: The coating layer of a coating sheet was abraded by a cutter and used as a coating layer sample. After this coating layer sample was dried at 110° C. for 12 hours, the total volume of pores having a pore diameter of not larger than 50 nm was measured by use of mercury porosimeter ("PoreMaster 60" (trade name) of Yuasa Ionics Inc.).

Example 1

Raw material gas comprising 30 vol % of trichlorosilane and 70 vol % of tetrachlorosilane was fed with hydrogen in an amount which was 1.41 times the theoretical hydrogen amount and hydrolyzed at a temperature not lower than the melting point (1,600° C.) of silicon dioxide to obtain particulate silica. The obtained particulate silica had a fractal shape parameter α1 value in an α-value analysis target range of 20 to 30 nm of 2.119, a fractal shape parameter α2 value in an α-value analysis target range of 30 to 50 nm of 1.711, and a specific surface area of 222 m$^2$/g. These α values satisfy the equations (1) and (2) simultaneously. The results are shown in Table 1.

Examples 2 to 9 and Comparative Examples 1 to 9

Particulate silicas of the present invention and silicas for comparison were produced in the same manner as in Example 1 except that the mixing ratio of trichlorosilane and tetrachlorosilane and hydrogen excess ratios with respect to the theoretically required amount were changed to values shown in Table 1. In Comparative Examples 5 to 7 and 9, commercially available silicas were used. The results are shown in Table 1.

TABLE 1

| | Specific Surface Area S (m²/g) | Hydrogen Excess Ratio | Composition of Raw Material (Trichlorosilane/Tetrachlorosilane) | α1 | α2 |
|---|---|---|---|---|---|
| Ex. 1 | 222 | 1.41 | 30/70 | 2.119 | 1.711 |
| Ex. 2 | 220 | 1.59 | 30/70 | 2.109 | 1.702 |
| Ex. 3 | 221 | 1.47 | 50/50 | 2.111 | 1.689 |
| Ex. 4 | 217 | 1.56 | 75/25 | 2.128 | 1.676 |
| Ex. 5 | 220 | 1.69 | 25/75 | 2.120 | 1.701 |
| Ex. 6 | 201 | 1.41 | 30/70 | 2.119 | 1.699 |
| C. Ex. 1 | 218 | 1.26 | 10/90 | 2.321 | 1.845 |
| C. Ex. 2 | 219 | 1.37 | 10/90 | 2.236 | 1.781 |
| C. Ex. 3 | 221 | 1.38 | 15/85 | 2.221 | 1.779 |
| C. Ex. 4 | 208 | 1.26 | 10/90 | 2.321 | 1.845 |
| C. Ex. 5 | 200 | — | — | 2.230 | 1.751 |
| C. Ex. 6 | 198 | — | — | 2.227 | 1.727 |
| C. Ex. 7 | 209 | — | — | 2.236 | 1.763 |
| Ex. 7 | 313 | 1.47 | 30/70 | 1.950 | 1.540 |
| Ex. 8 | 308 | 1.47 | 50/50 | 1.940 | 1.570 |
| Ex. 9 | 308 | 1.59 | 30/70 | 1.900 | 1.490 |
| C. Ex. 8 | 311 | 1.26 | 10/90 | 2.060 | 1.700 |
| C. Ex. 9 | 302 | — | — | 2.020 | 1.660 |

| | α1 + 0.00175S | α2 + 0.00174S | Average Particle Diameter (nm) | Particle Size Distribution Uniformity | Oil Absorbability (ml/100 g) |
|---|---|---|---|---|---|
| Ex. 1 | 2.508 | 2.097 | 12.3 | 1.78 | 250 |
| Ex. 2 | 2.494 | 2.085 | 12.4 | 1.76 | 260 |
| Ex. 3 | 2.498 | 2.074 | 13.0 | 1.70 | 250 |
| Ex. 4 | 2.508 | 2.054 | 12.6 | 1.75 | 250 |
| Ex. 5 | 2.505 | 2.084 | 12.4 | 1.77 | 260 |
| Ex. 6 | 2.471 | 2.049 | 13.6 | 1.78 | 250 |
| C. Ex. 1 | 2.703 | 2.224 | 12.5 | 1.70 | 230 |
| C. Ex. 2 | 2.619 | 2.162 | 12.5 | 1.73 | 220 |
| C. Ex. 3 | 2.608 | 2.164 | 12.3 | 1.75 | 230 |
| C. Ex. 4 | 2.685 | 2.207 | 14.0 | 1.75 | 230 |
| C. Ex. 5 | 2.580 | 2.099 | 13.6 | 1.70 | 220 |
| C. Ex. 6 | 2.574 | 2.072 | 13.8 | 1.73 | 230 |
| C. Ex. 7 | 2.602 | 2.127 | 13.0 | 1.75 | 220 |
| Ex. 7 | 2.498 | 2.085 | 7.3 | 1.90 | 270 |
| Ex. 8 | 2.479 | 2.104 | 7.4 | 1.88 | 270 |
| Ex. 9 | 2.439 | 2.026 | 8.9 | 1.92 | 270 |
| C. Ex. 8 | 2.604 | 2.241 | 7.9 | 1.87 | 240 |
| C. Ex. 9 | 2.549 | 2.185 | 7.2 | 1.91 | 250 |

Ex.: Example,
C. Ex.: Comparative Example
Particle Size Distribution Uniformity = $D_{60}/D_{10}$ Application Example 1

2.5 parts by weight of the particulate silicas obtained in Examples 1 to 9 were added to 100 parts by weight of liquid unsaturated polyester resin (POLYHOPE P290 (trade name) of Japan Composite Co., LTD.), dispersed at room temperature by means of DISPER of PRIMIX Corporation at 1,000 rpm (gentle dispersion) and 3,000 rpm (medium dispersion) for 2 minutes, and left to stand in a thermostatic water bath of 25° C. for 2 hours, and the viscosities of the resins were measured at 60 rpm by means of BL-type rotating viscometer. The results of the measurements of the viscosities of the liquid unsaturated polyester resins are shown in Table 2.

TABLE 2

| | Liquid Polyester Resin Viscosity cP (Gentle Dispersion 1000 rpm) | Liquid Polyester Resin Viscosity cP (Medium Dispersion 3000 rpm) | Water Slurry Viscosity cP |
|---|---|---|---|
| Ex. 1 | 5520 | 5600 | 5300 |
| Ex. 2 | 5780 | 5650 | 5560 |
| Ex. 3 | 5180 | 5260 | 5160 |
| Ex. 4 | 5150 | 5120 | 5290 |
| Ex. 5 | 5900 | 5940 | 5000 |
| Ex. 6 | 5490 | 5500 | 5040 |
| C. Ex. 1 | 3670 | 4800 | 2250 |
| C. Ex. 2 | 4920 | 5030 | 2450 |
| C. Ex. 3 | 4830 | 4980 | 3180 |
| C. Ex. 4 | 3420 | 4680 | 2380 |
| C. Ex. 5 | 3800 | 4540 | 3560 |
| C. Ex. 6 | 4750 | 5010 | 2280 |
| C. Ex. 7 | 3300 | 5090 | 2560 |
| Ex. 7 | 5030 | 5110 | 7130 |
| Ex. 8 | 5140 | 5230 | 7910 |
| Ex. 9 | 5200 | 5120 | 6500 |
| C. Ex. 8 | 4500 | 5100 | 1150 |
| C. Ex. 9 | 4260 | 5210 | 1630 |

Ex.: Example,
C. Ex.: Comparative Example

Comparative Application Example 1

The viscosities of liquid unsaturated polyester resins were measured in the same manner as in Application Example 1 except that the particulate silicas obtained in Comparative Examples 1 to 9 were used. The results are shown in Table 2.

Application Example 2

10 parts by weight of the particulate silicas obtained in Examples 1 to 9 were added to 90 parts by weight of ultrapure water, dispersed at room temperature by means of DISPER of PRIMIX Corporation at 1,000 rpm for 2 minutes and then left to stand in a thermostatic water bath of 25° C. for 2 hours, and the viscosities of the slurries were measured at 60 rpm by means of BL-type rotating viscometer. The results of the measurements of the viscosities of the water slurries are shown in Table 2.

Comparative Application Example 2

The viscosities of water slurries were measured in the same manner as in Application Example 2 except that the particulate silicas obtained in Comparative Examples 1 to 9 were used. The results are shown in Table 2.

Application Example 3

The particulate silica obtained in Example 7 was dispersed in ion exchange water to obtain a silica dispersion having a silica concentration of 15 wt %. 100 parts by weight of this silica dispersion was mixed with 1.3 parts by weight of polydiallyl methylamine hydrochloride aqueous solution having a cationic resin concentration of 60 wt % to obtain a premixed solution. After this premixed solution was atomized by means of a high-pressure homogenizer, it was aged at 25° C. for 7 days to obtain a modified silica dispersion. The average particle diameter of the silica in this modified silica dispersion was 100 nm. Then, 100 parts by weight of this modified silica dispersion was mixed with 15 parts by weight of 4-wt % boric acid aqueous solution and 75 parts by weight of 10-wt % polyvinyl alcohol aqueous solution (PVA117 of KURARAY CO., LTD.) to obtain a coating solution. After the obtained coating solution was applied on a surface of a PET sheet (MELINEX 705 of ICI JAPAN CO., LTD.) by use of a film coater (PI-1210 Film Coater of TESTER SANGYO CO., LTD.) such that the weight of the applied coating solution would be 20 g/m$^2$ when dried, it was dried to obtain a coated sheet. The pore volume of the obtained coating layer was 0.51 ml/g.

Application Example 4

A modified silica dispersion and a coated sheet were obtained in the same manner as in Application Example 3 except that the particulate silica obtained in Example 8 was used. The average particle diameter of the silica in the obtained modified silica dispersion was 105 nm, and the pore volume of the coating layer was 0.53 ml/g.

Application Example 5

A modified silica dispersion and a coated sheet were obtained in the same manner as in Application Example 3 except that the particulate silica obtained in Example 8 was used. The average particle diameter of the silica in the obtained modified silica dispersion was 102 nm, and the pore volume of the coating layer was 0.55 ml/g.

Comparative Application Example 3

Modified silica dispersions and coated sheets were obtained in the same manner as in Application Example 3 except that the particulate silica obtained in Comparative Example 8 and the commercially available silica used in Comparative Example 9 were used. The average particle diameter of the silica in the obtained modified silica dispersions was 100 nm, and the pore volumes of the coating layers were 0.42 ml/g and 0.45 ml/g, respectively.

Application Example 6

5 kg of the particulate silicas obtained in Examples 1 to 9 were agitated in a mixer having an inner volume of 300 L and substituted with nitrogen. At a reaction temperature of 240° C., hexamethyldisilazane as a hydrophobizing agent and water vapor were fed at feed rates of 25 g/min and 5 g/min, respectively, for 80 minutes to conduct hydrophobization for about 1 hour. After the reaction, nitrogen was fed at a feed rate of 40 L/min for 25 minutes, and unreacted materials and reaction side products were removed to obtain hydrophobized particulate silicas.

3 parts by weight of the hydrophobized particulate silicas were added to 100 parts by weight of vinylester resin (POLY-HOPE H6700 (trade name) of Japan Composite Co., LTD.), dispersed at room temperature by means of DISPER of PRIMIX Corporation at 1,000 rpm (gentle dispersion) for 2 minutes, and left to stand in a thermostatic water bath of 25° C. for 2 hours, and the viscosities of the resins were measured at 60 rpm by means of BL-type rotating viscometer. The results of measurements of the contents of carbon in the hydrophobized particulate silicas and the viscosities of the vinylester resins are shown in Table 3.

Comparative Application Example 4

Hydrophobization of particulate silicas was carried out in the same manner as in Application Example 6 except that the particulate silicas obtained in Comparative Examples 1 to 9 were used. Further, by use of the hydrophobized particulate silicas, measurements of the viscosities of vinylester resins were carried out in the same manner as in Application Example 6. The results of measurements of the contents of carbon in the hydrophobized particulate silicas and the viscosities of the vinylester resins are shown in Table 3.

Application Example 7

5.5 parts by weight of the hydrophobized particulate silicas obtained in Application Example 6 were added to 100 parts by weight of silicone fluid (silicone SH-200 1000cs (trade name) of Dow Corning Toray Co., Ltd.), dispersed at room temperature by means of DISPER of PRIMIX Corporation at 1,000 rpm (gentle dispersion) for 2 minutes, and left to stand in a thermostatic oven of 25° C. for 2 hours, and the viscosities of the silicones were measured at 60 rpm by means of BL-type rotating viscometer. The results of measurements of the contents of carbon in the hydrophobized particulate silicas and the viscosities of the silicones are shown in Table 3.

Comparative Application Example 5

The viscosities of silicone fluids were measured in the same manner as in Application Example 7 by use of the hydrophobized particulate silicas obtained in Comparative Application Example 4. The results of measurements of the contents of carbon in the hydrophobized particulate silicas and the viscosities of the silicone fluids are shown in Table 3.

Application Example 8

50 parts by weight of the hydrophobized particulate silicas obtained in Application Example 6 were added to 100 parts by weight of silicone fluids (silicone SH-200 10000cSt (trade name) of Dow Corning Toray Co., Ltd.) and kneaded by means of Labo Plastomill (MODEL 20R200 of TOYO SEIKI SEISAKU-SHO, LTD.) at 60 rpm for 30 minutes, followed by measurements of silicone torque values. The results of measurements of the contents of carbon in the hydrophobized particulate silicas and the silicone torque values are shown in Table 3.

Comparative Application Example 6

Silicone torque values were measured in the same manner as in Application Example 8 by use of the hydrophobized particulate silicas obtained in Comparative Application Example 4. The results of measurements of the contents of carbon in the hydrophobized particulate silicas and the silicone torque values are shown in Table 3.

(gentle dispersion) for 2 minutes, and left to stand in a thermostatic oven of 25° C. for 2 hours, and the viscosities of the resins were measured at 20 rpm by means of BH-type rotating viscometer. The results of measurements of the contents of carbon in the hydrophobized particulate silicas and the viscosities of the epoxy resins are shown in Table 4.

Comparative Application Example 7

Hydrophobization of particulate silicas was carried out in the same manner as in Application Example 9 except that the particulate silicas obtained in Comparative Examples 1 to 9 were used. Further, by use of the hydrophobized particulate silicas, measurements of epoxy resins were carried out in the same manner as in Application Example 9. The results of measurements of the contents of carbon in the hydrophobized particulate silicas and the viscosities of the epoxy resins are shown in Table 4.

Application Example 10

5.5 parts by weight of the hydrophobized particulate silicas obtained in Application Example 9 were added to 100 parts by weight of silicone fluid (silicone SH-200 1000cs (trade name) of Dow Corning Toray Co., Ltd.), dispersed at room temperature by means of DISPER of PRIMIX Corporation at 1,000

TABLE 3

| Raw Material Silica | Hydrophobizing Agent | Content of Carbon (%) | Viscosity of Vinylester Resin (cP) | Viscosity of Silicone Oil (cP) | Silicone Torque (kg·cm) |
|---|---|---|---|---|---|
| Ex. 1 | Hexamethyldisilazane | 2.4 | 3410 | 3440 | 91 |
| Ex. 2 | Hexamethyldisilazane | 2.4 | 3380 | 3510 | 91 |
| Ex. 3 | Hexamethyldisilazane | 2.4 | 3500 | 3720 | 90 |
| Ex. 4 | Hexamethyldisilazane | 2.3 | 3270 | 3580 | 91 |
| Ex. 5 | Hexamethyldisilazane | 2.4 | 3360 | 3520 | 90 |
| Ex. 6 | Hexamethyldisilazane | 2.3 | 3300 | 3620 | 90 |
| C. Ex. 1 | Hexamethyldisilazane | 2.3 | 2060 | 2930 | 82 |
| C. Ex. 2 | Hexamethyldisilazane | 2.3 | 2150 | 2910 | 80 |
| C. Ex. 3 | Hexamethyldisilazane | 2.4 | 2430 | 3050 | 81 |
| C. Ex. 4 | Hexamethyldisilazane | 2.3 | 2300 | 2850 | 80 |
| C. Ex. 5 | Hexamethyldisilazane | 2.3 | 2640 | 2910 | 80 |
| C. Ex. 6 | Hexamethyldisilazane | 2.3 | 2210 | 3040 | 81 |
| C. Ex. 7 | Hexamethyldisilazane | 2.3 | 2310 | 2770 | 80 |
| Ex. 7 | Hexamethyldisilazane | 3.5 | 4120 | 4200 | 94 |
| Ex. 8 | Hexamethyldisilazane | 3.4 | 4030 | 4320 | 92 |
| Ex. 9 | Hexamethyldisilazane | 3.4 | 4100 | 4240 | 91 |
| C. Ex. 8 | Hexamethyldisilazane | 3.5 | 3460 | 3500 | 83 |
| C. Ex. 9 | Hexamethyldisilazane | 3.4 | 3320 | 3430 | 82 |

Ex.: Example,
C. Ex.: Comparative Example

Application Example 9

5 kg of the particulate silicas obtained in Examples 1 to 9 were agitated in a mixer having an inner volume of 300 L and substituted with nitrogen. At a reaction temperature of 240° C., liquid polydimethylsiloxane (20 cs) as a hydrophobizing agent and water vapor were fed at feed rates of 50 g/min and 5 g/min, respectively, for 20 minutes to conduct hydrophobization for about 1 hour. After the reaction, nitrogen was fed at a feed rate of 40 L/min for 25 minutes, and unreacted materials and reaction side products were removed to obtain hydrophobized particulate silicas. 4 parts by weight of the hydrophobized particulate silicas were added to 100 parts by weight of epoxy resin (EPICOAT 819 (trade name) of Japan Epoxy Resins Co., Ltd.), dispersed at room temperature by means of DISPER of PRIMIX Corporation at 1,000 rpm rpm (gentle dispersion) for 2 minutes, and left to stand in a thermostatic water bath of 25° C. for 2 hours, and the viscosities of the silicones were measured at 60 rpm by means of BL-type rotating viscometer. The results of measurements of the contents of carbon in the hydrophobized particulate silicas and the viscosities of the silicones are shown in Table 4.

Comparative Application Example 8

The viscosities of silicone fluids were measured in the same manner as in Application Example 10 by use of the hydrophobized particulate silicas obtained in Comparative Application Example 7. The results of measurements of the contents of carbon in the hydrophobized particulate silicas and the viscosities of the silicone fluids are shown in Table 4.

TABLE 4

| Raw Material Silica | Hydrophobizing Agent | Content of Carbon (%) | Viscosity of Epoxy Resin (cP) | Viscosity of Silicone Oil (cP) |
|---|---|---|---|---|
| Ex. 1 | Polydimethylsiloxane | 5.5 | 23500 | 6620 |
| Ex. 2 | Polydimethylsiloxane | 5.5 | 25000 | 6590 |
| Ex. 3 | Polydimethylsiloxane | 5.5 | 25500 | 6640 |
| Ex. 4 | Polydimethylsiloxane | 5.4 | 24000 | 6490 |
| Ex. 5 | Polydimethylsiloxane | 5.5 | 25000 | 6520 |
| Ex. 6 | Polydimethylsiloxane | 5.4 | 24000 | 6450 |
| C. Ex. 1 | Polydimethylsiloxane | 5.4 | 18000 | 5100 |
| C. Ex. 2 | Polydimethylsiloxane | 5.4 | 18500 | 5230 |
| C. Ex. 3 | Polydimethylsiloxane | 5.5 | 17500 | 5160 |
| C. Ex. 4 | Polydimethylsiloxane | 5.4 | 17000 | 5010 |
| C. Ex. 5 | Polydimethylsiloxane | 5.4 | 17000 | 4990 |
| C. Ex. 6 | Polydimethylsiloxane | 5.4 | 17500 | 5120 |
| C. Ex. 7 | Polydimethylsiloxane | 5.4 | 17000 | 5030 |
| Ex. 7 | Polydimethylsiloxane | 5.5 | 25000 | 6830 |
| Ex. 8 | Polydimethylsiloxane | 5.4 | 25500 | 6790 |
| Ex. 9 | Polydimethylsiloxane | 5.4 | 24500 | 6800 |
| C. Ex. 8 | Polydimethylsiloxane | 5.5 | 19000 | 5230 |
| C. Ex. 9 | Polydimethylsiloxane | 5.4 | 18500 | 5190 |

Ex.: Example,
C. Ex.: Comparative Example

The invention claimed is:

1. A method for producing particulate silica by flame-hydrolyzing a volatile silicon compound in the presence of hydrogen, wherein mixed gas comprising 20 to 90 vol % of trichlorosilane and 10 to 80 vol % of tetrachlorosilane is used as the volatile silicon compound, and the amount of hydrogen used in flame hydrolysis is 1.20 to 2.20 times the theoretical amount.

2. Particulate silica having a BET specific surface area (S) of 130 to 380 m$^2$/g, which is produced by a flame thermal decomposition method, wherein in small-angle X-ray scattering analysis, a fractal shape parameter ($\alpha 1$) in an $\alpha$-value analysis target range of 20 to 30 nm satisfies the following equation (1) and a fractal shape parameter ($\alpha 2$) in an $\alpha$-value analysis target range of 30 to 50 nm satisfies the following equation (2):

$$\alpha 1 + 0.00175 S < 2.518 \qquad (1)$$

$$\alpha 2 + 0.00174 S < 2.105 \qquad (2)$$

wherein said flame thermal decomposition method comprises flame-hydrolyzing a volatile silicon compound in the presence of hydrogen, wherein mixed gas comprising 20 to 90 vol % of trichlorosilane and 10 to 80 vol % of tetrachlorosilane is used as the volatile silicon compound, and the amount of hydrogen used in flame hydrolysis is 1.20 to 2.20 times the theoretical amount.

3. The particulate silica of claim 2, wherein the mixed gas comprises 20 to 80 vol % of trichlorosilane and 20 to 80 vol % of tetrachlorosilane.

4. The particulate silica of claim 2, wherein the mixed gas comprises 30 to 70 vol % of trichlorosilane and 30 to 70 vol % of tetrachlorosilane.

5. The particulate silica of claim 2, wherein the amount of hydrogen used in flame hydrolysis is 1.3 to 1.8 times the theoretical amount.

6. The method of claim 1, wherein the mixed gas comprises 20 to 80 vol % of trichlorosilane and 20 to 80 vol % of tetrachlorosilane.

7. The method of claim 1, wherein the mixed gas comprises 30 to 70 vol % of trichlorosilane and 30 to 70 vol % of tetrachlorosilane.

8. The method of claim 1, wherein the amount of hydrogen used in flame hydrolysis is 1.3 to 1.8 times the theoretical amount.

* * * * *